United States Patent [19]

Takamizawa et al.

[11] 4,238,393

[45] Dec. 9, 1980

[54] ADDITIVES FOR COATING COMPOSITIONS

[75] Inventors: Minoru Takamizawa; Yoshio Inoue; Hiroshi Yoshioka; Masaki Moteki, all of Annaka, Japan

[73] Assignee: Shin-Etsu Chemical Co. Ltd., Tokyo, Japan

[21] Appl. No.: 726,440

[22] Filed: Sep. 27, 1976

[30] Foreign Application Priority Data

Oct. 1, 1975 [JP] Japan .................. 50-119050

[51] Int. Cl.$^3$ .................... C09D 3/00; C09D 3/82
[52] U.S. Cl. .................. 260/22 S; 106/287.13; 260/29.15 B; 260/46.5 E; 525/474; 528/30
[58] Field of Search ............. 260/448.2 N, 46.5 E, 260/22 S, 29.1 SB; 106/287.13; 525/474; 528/30

[56] References Cited

U.S. PATENT DOCUMENTS

| 2,604,487 | 7/1952 | Burkhard | 260/46.5 E |
|---|---|---|---|
| 2,655,489 | 10/1953 | Lawson | 260/22 S |
| 2,960,492 | 11/1960 | Morton et al. | 260/46.5 E |
| 2,961,346 | 11/1960 | Dereich | 260/22 S |
| 2,970,973 | 2/1961 | Thomas | 260/22 S |
| 3,170,940 | 2/1965 | Johnston | 260/46.5 E |
| 3,346,405 | 10/1967 | Viventi . | |
| 3,738,955 | 6/1973 | Bozer et al. | 260/46.5 E |
| 3,816,282 | 6/1974 | Viventi | 260/46.5 E |
| 3,945,957 | 3/1976 | Noshiro et al. | 260/22 S |
| 4,002,794 | 1/1977 | Schwarcz | 260/46.5 E |

FOREIGN PATENT DOCUMENTS 1102251  2/1965  United Kingdom .

OTHER PUBLICATIONS

Singer, Fundamentals of Paint, Varnish and Lacquer Technology, American Paint Journal Co., St. Louis, Mo., 1957, pp. 4–6, 183–185.

Primary Examiner—Ronald W. Griffin
Attorney, Agent, or Firm—Toren, McGeady and Stanger

[57] ABSTRACT

The additives for coating compositions comprise as an essential component an organopolysiloxane having in the molecule at least one siloxane unit to which one or more mercapto-substituted hydrocarbon groups are bonded. The additives serve to impart blocking resistance to surfaces.

9 Claims, No Drawings

ADDITIVES FOR COATING COMPOSITIONS

BACKGROUND OF THE INVENTION

This invention relates to additives for coating compositions and coating compositions containing them.

In general, the surfaces of coating films formed by application of various coating compositions are deficient in that they tend to sustain injuries, stains or haze when kept in contact with any other surfaces. This unfavorable tendency is particularly prominent in case the coating films have a comparatively low hardness. It is known that overlaid plywood coated with a pyroxyline lacquer or an aminoalkyd resin enamel or steel plates coated with an acrylic resin enamel when put one on another or as rolls with individual coated surfaces in contact, tend to have injuries or haze incurred in the coating layers. It is also known that when a pressure-sensitive adhesive tape is pressed onto the coated surface and then peeled off, part of the coating layer transfers to the contacted surfaces of the adhesive tape, resulting in the breakage of the coating surface. This sort of phenomenon is called blocking.

In the prior art, improvements have been proposed in order to eliminate or mitigate the blocking phenomenon for example, by adding to coating compositions a small amount of a dimethylsilicone fluid, organopolysiloxanepolyoxyalkylene copolymer, aminoalkylsiloxane-dimethylsiloxane copolymer, or the like (see, for example, Japanese Patent Publications No. 18985/'72 and 4367/'73). However, the addition of the dimethylsilicone fluids can not sufficiently prevent the blocking phenomenon and may cause the unfavorable phenomenon of cratering to the coated surfaces, although it advantageously serves to increase the leveling effect of coatings and prevent the separation of pigments, which is usually called flooding. The addition of the copolymers, on the other hand, serves to obviate the possibility of the cratering phenomenon, but not to sufficiently prevent the blocking phenomenon. For example, blocking takes place when the pressing and peeling movements of a pressure-sensitive adhesive tape on and off the surface of the coating layer are continuously repeated, or when overlaid plywood is given a hot press treatment in the course of manufacture.

SUMMARY OF THE INVENTION

It is, therefore, an object of this invention to provide additives useful to produce coating compositions which are free of the possibility of the blocking phenomenon, as well as the occurrence of flooding and cratering.

Another object of the invention is to provide additives which are effective irrespective of the types of coating compositions.

A further object of the invention is to provide coating compositions in which the additive is contained.

The additive for coating compositions in accordance with the invention comprises an organopolysiloxane expressed by the general formula

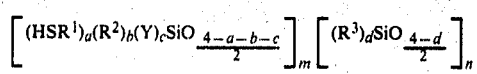

where $R^1$ is a divalent hydrocarbon group having from 1 to 12 carbon atoms, $R^2$ is a substituted or unsubstituted monovalent hydrocarbon group otherr than the mercaptosubstituted hydrocarbon groups, $R^3$ has the same definition as $R^2$, Y is a hydroxy group or a hydrolyzable group, a is 1, 2 or 3, b is 0, 1 or 2, c is 0, 1 or 2, with the proviso that (a+b+c) is 1, 2 or 3, d is 0, 1, 2 or 3, m is a positive number, and n is 0 or a positive number.

DETAILED DESCRIPTION OF THE PREFERRED EMBODIMENTS

The above-mentioned mercapto-containing organopolysiloxane as the essential component of the additive in accordance with the present invention contains at least one siloxane unit expressed by the general formula

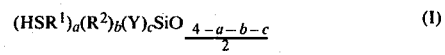

where $R^1$, $R^2$, Y, a, b, and c are the same as defined above.

Illustrative of the divalent hydrocarbon groups having from 1 to 12 carbon atoms represented by $R^1$ in the above formula are alkylene groups, such as methylene, ethylidene, ethylene and propylene groups; alicyclic groups, such as cyclohexylene group; and arylene groups, such as phenylene and tolylene groups.

Illustrative of the substituted or unsubstituted monovalent hydrocarbon groups represented by $R^2$ are alkyl groups, such as methyl, ethyl, propyl and butyl groups; cycloalkyl groups, such as cyclohexyl group; aryl groups, such as phenyl group; aralkyl groups, such as phenylethyl group; and those groups derived from the above-mentioned hydrocarbon groups by the partial substitution of the hydrogen atoms with halogen atoms or cyano groups.

Illustrative of the hydrolyzable groups represented by Y in formula (I) are alkoxy, amino, ketoxime and acyloxy groups.

The examples of the siloxane units in conformity with formula above include the following.

(1) $(HSCH_2CH_2)SiO_{1.5}$ unit

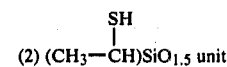

(3) $(HSCH_2CH_2CH_2)SiO_{1.5}$ unit
(4) $(HSC_6H_4)SiO_{1.5}$ unit
(5) $(HSCH_2CH_2)(CH_3)SiO$ unit
(6) $(HSCH_2CH_2)_2SiO$ unit
(7) $(HSCH_2CH_2CH_2)(OH)SiO$ unit
(8) $(HSCH_2CH_2)(CH_3O)SiO$ unit
(9) $(HSCH_2CH_2)(CH_3O)(CH_3)SiO_{0.5}$ unit Another kind of siloxane units which may be contained in the organopolysiloxane of the present invention is a conventional siloxane unit having no mercapto group, and expressed by the general formula

where $R^3$ and d are the same as previously defined.

The examples of these siloxane units (II) include the following.

(1) $(CH_3)SiO_{1.5}$ unit
(2) $(C_6H_5)SiO_{1.5}$ unit
(3) $(CH_2=CH)SiO_{1.5}$ unit
(4) $(CH_3)_2SiO$ unit
(5) $(C_6H_5)(CH_3)SiO$ unit (6) $(CH_2=CH)(CH_3)SiO$ unit
(7) $(C_6H_5)_2SiO$ unit
(8) $(C_2H_5)_2SiO$ unit
(9) $(CH_3)_3SiO_{0.5}$ unit
(10) $(C_6H_5)(CH_3)_2SiO_{0.5}$ unit
(11) $(CH_2=CH)(CH_3)_2SiO_{0.5}$ unit The above-described organopolysiloxanes have a molecular configuration of either a linear chain structure, a branched chain structure, a ring structure or a network structure.

Several of the examples of the organopolysiloxanes containing one or more mercapto groups, as the essential component of the additive of the present invention are:

The organopolysiloxane thus prepared can be added, in the form as is, to a coating composition in a required amount, but it is optional that, according to the necessity, the organopolysiloxane is added in the form of a solution in an organic solvent, or in the form of an aqueous emulsion using a surface active agent. The emulsion-type additive is particularly suitable for water-based coating compositions. The amounts of the organopolysiloxane to be added to a coating composition range from 0.01 to 15% by weight, preferably from 0.05 to 5% by weight based on the solid component of the coating composition. When the amount is less than the above range, no improving effect can be expected, while excessive amounts can not work to produce any additional effect.

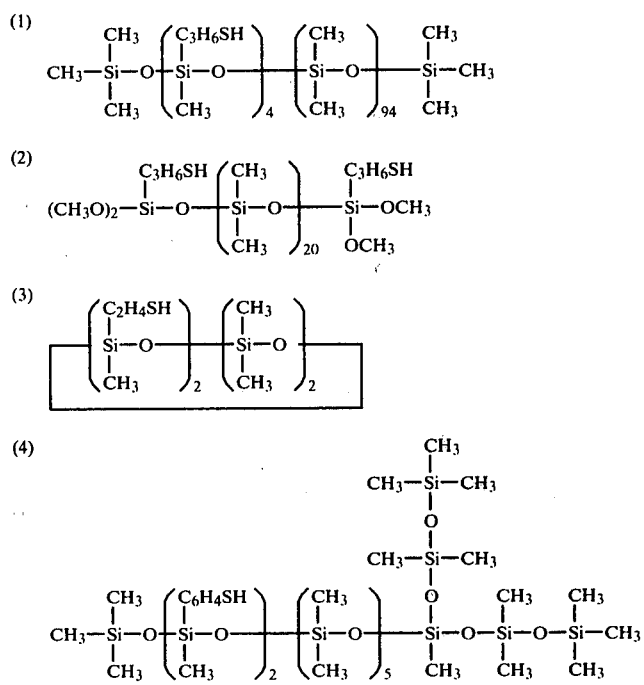

(5) an organopolysiloxane having a resin structure expressed by the average formula

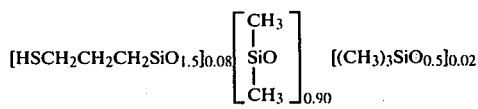

These organopolysiloxanes can be prepared by any known methods, involving, for example, (1) cohydrolysis-condensation of a mixture consisting of an organoalkoxysilane having one or more mercaptosubstituted hydrocarbon groups and an alkoxysilane having no mercapto groups, (2) reaction of an organoalkoxysilane having one or more mercapto-substituted hydrocarbon groups with a cyclic organopolysiloxane or with a hydroxy-terminated diorganopolysiloxane having no mercapto groups, (3) equilibrium reaction of a cyclic or linear chain organopolysiloxane having one or more mercapto-substituted hydrocarbon groups with a cyclic or linear chain organopolysiloxane having no mercapto groups, and (4) reaction of an organopolysiloxane having one or more halogenoalkyl groups with an alkali metal sulfide or with thiourea and ammonia or an alkali hydroxide.

The additives for coating compositions according to the present invention can be applied for various kinds of coating compositions, including, for example, oil-based coatng compositions, water-based coating compositions, oleovarnishes, spirit (alcoholic) varnishes, coating compositions based on cellulose derivatives, synthetic resin coating compositions, based on phenol-formaldehyde resins, amino-formaldehyde alkyd resins, epoxy resins, polyurethane resins, diallylphthalate resins, and aqueous emulsion coating compositions based on vinyl chloride copolymer emulsions, polyvinyl acetate emulsions, arcylic emulsions and the like.

The coating compositions prepared by adding thereto the organopolysiloxane having one or more mercapto-substituted hydrocarbon groups in accordance with the present invention can satisfactorily eliminate the occurrence of the unfavorable blocking phenomonon in the coating films.

The following examples will further illustrate the present invention.

EXAMPLE 1.

Into 50 g of a 0.05% aqueous hydrochloric acid in a reaction vessel equipped with a stirrer was dropped 180 g (1 mole) of 3-mercaptopropyl methyldimethoxysilane with stirring over a period of 30 minutes and after another 5 hours' stirring 200 g of toluene was further added.

By allowing the resulting reaction mixture to stand, the lower layer of an aqueous hydrochloric acid was separated, and the supernatant liquid in the upper layer was washed five times with 50 ml each of water. After the toluene solution was dehydrated with anhydrous sodium sulfate, toluene and other volatile components were distilled off under reduced pressure, thus giving 121.3 g of a clear oily substance with a viscosity of 65.5 centistokes at 25° C. and a refractive index of 1.4995° at 25° C.

Then, in another reaction vessel equipped with a stirrer, was charged 10.7 g of the above oily substance, 3.2 g of hexamethyldisiloxane, 139.1 g of octamethylcyclotetrasiloxane and 12 g of activated clay, to carry out an equilibrium reaction with stirring for 8 hours at 80° C. After cooling to room temperature, the activated clay was removed by filtration and the low boiling volatile components were distilled off, thus giving 140.8 g of a clear oily substance with a viscosity of 164.5 centistokes at 25° C. and a refractive index of 1.409° at 25° C.

The oily substance thus obtained was a block copolymer of 3-mercaptopropyl-substituted siloxane units and dimethylsiloxane units expressed by the average unit formula

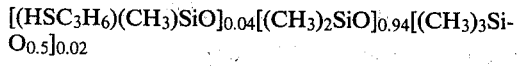

as supported by the analysis of the infrared absorption spectrum. This substance, or Additive No. 1 as it is referred to in the examples, was added to an aminoalkyd resin varnish previously admixed witn an acidic hardener (a reaction catalyst). The amount of the oily substance with 0.1% by weight, 0.3% by weight or 0.5% by weight based on the solid component of varnish, to form the coating compositions of this invention.

Each of the thus formed coating compositions was then applied to 4 sheets of paraffin paper for overlaid plywood in an amount of 15 to 25 g/m² (as solid). All groups of the thus coated sheets were heated for 100 seconds at 100° C. to cure the coating film and one group was further subjected to a hot pressing under a pressure of 10 kg/cm² for 5 minutes at 130° C. No cratering was found to occur in the cured films on the resulting test sheets.

These four groups of test sheets were then tested to determine their anti-blocking properties. The test was carried out as follows. A cellophane-based pressure-sensitive adhesive tape, 18 mm × 60 mm (manufacture of Nichiban Co., Japan) was put on the coated surface of the test sheet under a pressure of 1 kg and then promptly peeled. This pressing-and-peeling movement was repeated till the coating film became broken at the same place, and the number of times of such repetition was recorded to show the degree of blocking resistance.

In performing the pressing-and-peeling procedure, the adhesive tape was pressed and immediately thereafter peeled, followed by repetition of such pressing-and-peeling movements (Testing A or D); the adhesive tape was pressed and, after standing for 3 days, peeled, followed by the repeated pressing-and-peeling movements (Testing B); or the adhesive tape was pressed and, after standing for 7 days, peeled, followed by the repeated pressing-and-peeling movements (Testing C).

For purposes of comparison, similar tests were carried out with the exception that the coating composition contained an aminoalkylsiloxane-dimethylsiloxane copolymer instead of the mercapto-containing block copolymer, or that the coating composition did not contain the mercapto-containing block copolymer at all.

The results of the above tests are set out in Table I.

Table I

| | Number of times repeated by amounts of additive used, % | | | | | | | | | | | |
|---|---|---|---|---|---|---|---|---|---|---|---|---|
| | Testing A | | | Testing B | | | Testing C | | | Testing D | | |
| | 0.1 | 0.3 | 0.5 | 0.1 | 0.3 | 0.5 | 0.1 | 0.3 | 0.5 | 0.1 | 0.3 | 0.5 |
| Additive No. 1 | 11 | 13 | 15 | 10 | 15 | 16 | 8 | 12 | 12 | 9 | 11 | 14 |
| Comparative additive | 5 | 8 | 11 | 0 | 0 | 0 | 0 | 0 | 0 | 2 | 4 | 6 |
| No additive | 0 | 0 | 0 | 0 | 0 | 0 | 0 | 0 | 0 | 0 | 0 | 0 |

Note: Curing conditions: Sheets A, B and C, heated at 100° C. for 100 sec.; Sheet D, heated at 100° C. for 100 sec., followed by a subsequent hot press at 130° C.

EXAMPLE 2.

Block copolymers expressed by the average unit formula

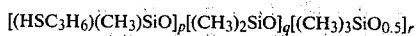

where p, q and r each are positive integers with the proviso that (p+q+r) is equal to 1. "Additive No. 2 through 8", were prepared using the same reaction procedure as in Example 1 except that the amounts of the reactants, i.e., the oily substance as the intermediate product, hexamethyldisiloxane (referred to as "M₂") and octamethylcyclotetrasiloxane (referred to as "D₄") and the activated clay were varied as indicated in Table II. The yields and the physical properties, say, viscosity and refractive index, both measured at 25° C., of the block copolymers thus produced are also shown in the table.

TABLE II

| Addi-tive No. | Composition of Reactant | | | | Composition of the organopolysiloxane | | | Yield g | Properties | |
|---|---|---|---|---|---|---|---|---|---|---|
| | Oily sub-stance mole* | M₂ mole** | D₄ mole*** | Acti-vated clay g | p | q | r | | Vis-cosity cS | Refrac-tive index |
| 2 | 0.0097 | 0.0198 | 1.75 | 10.6 | 0.0055 | 0.0111 | 0.983 | 122.9 | 360.4 | 1.405 |
| 3 | 0.0142 | 0.0284 | 1.86 | 11.4 | 0.0075 | 0.0149 | 0.978 | 128.9 | 235.9 | 1.407 |
| 4 | 0.0878 | 0.137  | 2.58 | 16.9 | 0.0313 | 0.0488 | 0.920 | 197.7 | 43.5  | 1.406 |
| 5 | 0.0796 | 0.0605 | 1.38 | 9.2  | 0.0524 | 0.0398 | 0.908 | 106.0 | 55.8  | 1.409 |
| 6 | 0.120  | 0.0605 | 1.32 | 9.5  | 0.0780 | 0.0403 | 0.880 | 108.4 | 53.4  | 1.415 |
| 7 | 0.0796 | 0.0198 | 1.42 | 9.2  | 0.0524 | 0.0130 | 0.935 | 106.7 | 232.5 | 1.412 |
| 8 | 0.120  | 0.0395 | 1.54 | 10.7 | 0.0706 | 0.0232 | 0.906 | 125.3 | 170.2 | 1.413 |

*Calculated as the mercaptopropylmethylsiloxane unit 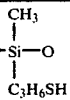

**Calculated as the trimethylsiloxy unit $(CH_3)_3SiO_{0.5}$
***Calculated as the dimethylsiloxane unit $(CH_3)_2SiO$ Each of the above Additives No. 2 through 8 was added to the same aminoalkyd resin varnish as in Example 1, in an amount of 0.3% by weight based on the solid component of the varnish to form coating compositions. With the coating compositions, the tests for the number of times of the repeated pressing-and-peeling movements were carried out in the same manner as in Example 1, with the results as set out in Table III.

Table III

| Additive No. | Testing A | Testing B | Testing C | Testing D |
|---|---|---|---|---|
| 2 | 17 | 11 | 5  | 9  |
| 3 | 18 | 12 | 6  | 10 |
| 4 | 9  | 6  | 4  | 6  |
| 5 | 11 | 11 | 10 | 8  |
| 6 | 22 | 28 | 20 | 18 |
| 7 | 31 | 16 | 15 | 15 |
| 8 | 22 | 23 | 19 | 15 |

EXAMPLE 3

Into a reaction vessel were put 39.2 g of 3-mercaptopropyl trimethoxysilane, 149.8 g of dimethylpolysiloxane with hydroxy groups at both chain ends (the hydroxy content being about 2.3% by weight), 1 g of trifluoroacetic acid and 150 g of toluene. The mixture was heated under reflux for 2 hours in a dry nitrogen atmosphere, and the reaction was completed within further 4 hours, distilling off the methanol produced by condensation. After cooling, 0.8 g of sodium hydrogen carbonate was added to the reaction mixture, followed by stirring for 1 hour. The resulting mixture was filtrated and any volatile components were removed by distillation, to produce 157.3 g of an oily substance having a viscosity of 35.2 centistokes at 25° C. and a refractive index of 1.408. The oily substance (referred to as Additive No. 9) was an organopolysiloxane expressed by the following formula.

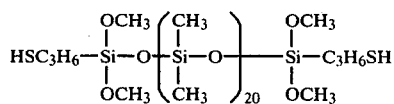

Using the above Additive No. 9, a coating composition was prepared in the same manner as in Example 2, and with this coating composition a similar testing A, B or C was carried out to determine its anti-blocking properties by the number of times of the pressing-and-peeling movements could be repeated. The results were as follows.

| Testing A | Testing B | Testing C |
|---|---|---|
| 10 | 11 | 8 |

EXAMPLE 4

A mixture of 16.6 g of 2-mercaptoethyl methyldimethoxysilane and 480 g of dimethyldimethoxysilane was dropped into 300 g of 0.05% aqueous hydrochloric acid held at 60° C. in a reaction flask over a period of 2 hours, followed by stirring for additional 1 hour. The aqueous hydrochloric acid was separated from the mixture after having been allowed to stand, and the reaction product was admixed with 200 ml of toluene and washed 5 times, each time with 50 ml of water. The resulting liquid was dehydrated with anhydrous sodium sulfate, and then stripped of the toluene and low boiling volatile components by distillation under reduced pressure, to produce 269.3 g of an oily substance, having a viscosity of 68.4 centistokes at 25° C. and a refractive index of 1.4972 at 25° C. The oily substance (referred to as Additive No. 10) was an organopolysiloxane corresponding to the following average unit formula.

$$[(HSC_2H_4)(CH_3)SiO]_{0.024}[(CH_3)_2SiO]_{0.976}$$

This organopolysiloxane had a small amount of residual hydroxy groups.

Using the above Additive No. 10, a coating composition was prepared in the same manner as in Example 2, and with this coating composition a similar testing A, B or C was carried out to determine its anti-blocking properties by the number of times of the pressing-and-peeling movements repeated. The results were as follows.

| Testing A | Testing B | Testing C |
|---|---|---|
| 9 | 10 | 6 |

EXAMPLE 5

Coating compositions were prepared, each based on a diallyl phthalate resin vehicle and including one of Additives Nos. 1–10, the formulation of each composition being as follows:

| Diallyl phthalate polymer | 380 parts |
|---|---|
| Diallyl phthalate monomer | 40 parts |
| Unsaturated polyester resin | 130 parts |
| Benzoyl peroxide | 15 parts |
| Thinner solvent | 400 parts |
| One of Additives Nos. 1–10 | 2.7 parts |

Note:
The above parts are all by weight.

Each of the coating compositions obtained above was applied to the surfaces of 3 sheets of paraffin paper for overlaid plywood in an amount of 30 to 35 g/m² (as solid). All the coated sheets were dried to remove the solvent, and press-cured by heating at 120° C. under a pressure of 10 kg/cm² for 10 minutes. Thereafter, tests for blocking were carried out with the thus treated sheets in the same manner as in the preceding examples with the results as set out in Table IV.

For purposes of comparison, similar tests were carried out with the exception that the coating composition contained an aminoalkylsiloxane-dimethylsiloxane copolymer instead of the additive of the present invention, or that the coating composition contained neither of them. The results are shown also in Table IV.

Table IV

|  | Testing A | Testing B | Testing C |
|---|---|---|---|
| Additive No. 1 | 12 | 12 | 10 |
| 2 | 13 | 11 | 7 |
| 3 | 14 | 12 | 7 |
| 4 | 11 | 9 | 6 |
| 5 | 13 | 12 | 10 |
| 6 | 16 | 15 | 15 |
| 7 | 18 | 19 | 14 |
| 8 | 18 | 17 | 18 |
| 9 | 12 | 13 | 9 |
| 10 | 11 | 10 | 8 |
| Comparative additive | 6 | 0 | 0 |
| No additive | 0 | 0 | 0 |

It may be added that in all the examples given above, the test sheets exhibited a good appearance when coated with the compositions including the additive of the present invention or the comparative additive, but did not exhibit a good appearance due to occurrence of cratering when coated with the compositions containing none of the additives.

What is claimed is:

1. In a paint, lacquer, or varnish composition which contains an organopolysiloxane, the improvement which comprises said organopolysiloxane being present in an anti-blocking effective amount within the range from about 0.05% to 15% by weight based on the solids in the composition and having the formula

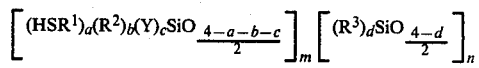

where
R¹ is a divalent hydrocarbon group having from 1 to 12 carbon atoms;
R² is a substituted or unsubstituted monovalent hydrocarbon group other than the mercapto-substituted hydrocarbon groups;
R³ has the same definition as R²;
Y is a hydroxy group or a hydrolyzable group;
a is 1, 2 or 3;
b is 0, 1 or 2;
c is 0, 1 or 2, with the proviso that (a+b+c) is 1, 2, or 3;
d is 0, 1, 2 or 3;
m is a positive number; and
n is 0 or a positive number.

2. The coating composition as claimed in claim 1 wherein said divalent hydrocarbon group R¹ is selected from the group consisting of alkylene groups, divalent alicyclic hydrocarbon groups and arylene groups.

3. The composition as claimed in claim 1 wherein said divalent hydrocarbon group R¹ is ethylene or propylene.

4. The coating composition as claimed in claim 1 wherein said monovalent hydrocarbon group R² is selected from the group consisting of alkyl groups, alkenyl groups, cycloalkyl groups, aryl groups and aralkyl groups.

5. The coating composition as claimed in claim 1 wherein said monovalent hydrocarbon group R² is a methyl group.

6. The coating composition as claimed in claim 1 wherein said hydrolyzable group Y is selected from the group consisting of amino groups, aminoxy groups, alkoxy groups, ketoxime groups and acyloxy groups.

7. The coating composition as claimed in claim 1 wherein said organopolysiloxane is dispersed in water.

8. The coating composition as claimed in claim 1 wherein said organopolysiloxane is dissolved in an organic solvent.

9. An article coated with the composition of claim 1.

* * * * *